US006989101B2

(12) United States Patent
Cumberland et al.

(10) Patent No.: US 6,989,101 B2
(45) Date of Patent: Jan. 24, 2006

(54) MICROORGANISM-REMOVING FILTER MEDIUM HAVING HIGH ISOELECTRIC MATERIAL AND LOW MELT INDEX BINDER

(75) Inventors: Scott L. Cumberland, Oakland, CA (US); Edward B. Rinker, Oakland, CA (US); Carlos Enriquez, Oakland, CA (US)

(73) Assignee: The Clorox Company, Oakland, CA (US)

( * ) Notice: Subject to any disclaimer, the term of this patent is extended or adjusted under 35 U.S.C. 154(b) by 103 days.

(21) Appl. No.: 10/407,506

(22) Filed: Apr. 4, 2003

(65) Prior Publication Data
US 2004/0195180 A1   Oct. 7, 2004

(51) Int. Cl.
C02F 1/28   (2006.01)
(52) U.S. Cl. ..................... 210/660; 210/764
(58) Field of Classification Search ............... 210/660, 210/764; 422/28
See application file for complete search history.

(56) References Cited

U.S. PATENT DOCUMENTS

| 3,737,045 A | 6/1973 | Hashimoto et al. ......... 210/490 |
| 4,038,351 A | 7/1977 | Koenst, Jr. et al. ........ 264/45.1 |
| 4,148,734 A | 4/1979 | Hilterhaus et al. ............ 264/48 |
| 4,163,725 A | 8/1979 | Sano et al. ................... 210/490 |
| 4,305,782 A | 12/1981 | Ostreicher et al. .......... 162/181 |
| 4,361,486 A | 11/1982 | Hou et al. ................... 210/722 |
| 4,385,998 A | 5/1983 | Schiller et al. ............. 210/807 |
| 4,473,474 A | 9/1984 | Ostreicher et al. .......... 210/636 |
| 4,482,641 A | 11/1984 | Wennerberg ................ 502/182 |
| 4,515,692 A | 5/1985 | Chandler et al. ........... 210/278 |
| 4,517,094 A | 5/1985 | Beall ......................... 210/664 |
| 4,518,053 A | 5/1985 | Queveau .................... 180/14.2 |
| 4,548,769 A | 10/1985 | Shimomura et al. ......... 264/22 |
| 4,561,976 A | 12/1985 | Houser ....................... 210/290 |
| 4,562,039 A | 12/1985 | Koehler ........................ 419/2 |
| 4,564,450 A | 1/1986 | Piper et al. ................. 210/293 |
| 4,569,756 A | 2/1986 | Klein ......................... 210/193 |
| 4,576,929 A | 3/1986 | Shimazaki ................. 502/417 |
| 4,595,500 A | 6/1986 | Galbiati ..................... 210/266 |
| 4,606,823 A | 8/1986 | Lucas, III .................. 210/282 |
| 4,609,463 A | 9/1986 | Macevicz et al. ........... 210/238 |
| 4,609,466 A | 9/1986 | McClausland et al. ...... 210/244 |
| 4,665,050 A | 5/1987 | Degen et al. ............... 502/402 |
| 4,687,573 A | 8/1987 | Miller et al. ................ 210/143 |
| 4,698,157 A | 10/1987 | Gillot ......................... 210/496 |
| 4,714,690 A | 12/1987 | Strack et al. ................ 502/64 |
| 4,743,418 A | 5/1988 | Barnes, Jr. et al. ........... 264/48 |
| 4,753,728 A | 6/1988 | VanderBilt et al. .......... 210/282 |
| 4,753,730 A | 6/1988 | Maurer ....................... 210/483 |
| 4,759,844 A | 7/1988 | Lipschultz et al. ...... 210/257.2 |
| 4,769,143 A | 9/1988 | Deutsch et al. ............. 210/266 |
| 4,772,455 A | 9/1988 | Izumi et al. ................ 423/210 |
| 4,784,769 A | 11/1988 | Giordano, Jr. et al. .. 210/500.21 |
| 4,800,018 A | 1/1989 | Moser ........................ 210/266 |
| 4,802,985 A | 2/1989 | Sugimori et al. ......... 210/502.1 |
| 4,806,246 A | 2/1989 | Nomura ..................... 210/651 |
| 4,859,384 A | 8/1989 | Fibiger et al. ............. 264/45.1 |
| 4,859,386 A | 8/1989 | VanderBilt et al. ......... 264/113 |
| 4,865,726 A | 9/1989 | De Vries .................... 210/137 |
| 4,875,910 A | 10/1989 | Dunningan et al. ............ 55/74 |
| 4,882,072 A | 11/1989 | Eberhardt ................... 210/752 |
| 4,894,154 A | 1/1990 | Roz et al. ................... 210/266 |
| 4,894,159 A | 1/1990 | Guiver et al. .......... 210/500.41 |
| 4,898,676 A | 2/1990 | Horowitz et al. ........... 210/668 |
| 4,929,406 A | 5/1990 | Abe et al. .................. 264/45.5 |
| 4,933,081 A | 6/1990 | Sasaki et al. ............... 210/490 |
| 4,935,442 A | 6/1990 | Urban ........................ 514/450 |
| 4,948,499 A | 8/1990 | Peranio ...................... 210/180 |
| 4,954,469 A | 9/1990 | Robinson .................... 502/80 |
| 4,966,872 A | 10/1990 | Horowitz et al. .............. 502/7 |
| 4,969,991 A | 11/1990 | Valadez ..................... 210/96.2 |
| 4,978,444 A | 12/1990 | Rommel .................... 210/169 |
| 4,990,248 A | 2/1991 | Brown et al. ............... 210/136 |
| 4,990,254 A | 2/1991 | Toida et al. ................ 210/464 |
| 5,002,836 A | 3/1991 | Dinwoodie et al. ......... 428/614 |
| 5,004,541 A | 4/1991 | Noll et al. .................. 210/251 |
| 5,007,994 A | 4/1991 | Snee .......................... 204/240 |
| 5,017,318 A | 5/1991 | Vanderbilt et al. .......... 264/113 |
| 5,032,261 A | 7/1991 | Pyper ......................... 210/137 |
| 5,033,465 A | 7/1991 | Braun et al. ........... 128/205.27 |
| 5,041,220 A | 8/1991 | Lee et al. ................. 210/321.8 |
| 5,045,198 A | 9/1991 | Norton .................. 210/321.87 |
| 5,051,189 A | 9/1991 | Farrah ....................... 210/679 |
| 5,059,317 A | 10/1991 | Marius et al. .............. 210/202 |

(Continued)

FOREIGN PATENT DOCUMENTS

JP          08295506 A    * 11/1996

(Continued)

OTHER PUBLICATIONS

US 4,936,985, 06/1990, Hahn (withdrawn)
US 5,872,068, 02/1999, Cartwright et al. (withdrawn)

Primary Examiner—Robert A. Hopkins
(74) Attorney, Agent, or Firm—R'Sue P. Caron

(57) ABSTRACT

A filter medium capable of removing microorganisms from a fluid such as water. The filter medium includes particles of activated carbon, particles of a substantially insoluble inorganic material having an isoelectric point greater than the fluid being filtered. A low melt index binder, preferably with a melt index of less than about 1 gram per 10 minutes, binds the particles of activated carbon and particles of inorganic material, such that the binder will become tacky at elevated temperatures without becoming sufficiently liquid to substantially wet the particles of activated carbon and inorganic material.

56 Claims, 5 Drawing Sheets

U.S. PATENT DOCUMENTS

| | | | | |
|---|---|---|---|---|
| 5,061,367 | A | 10/1991 | Hatch et al. | 210/137 |
| 5,061,374 | A | 10/1991 | Lewis | 210/638 |
| 5,064,534 | A | 11/1991 | Busch et al. | 210/266 |
| 5,068,030 | A | 11/1991 | Chen | 210/95 |
| 5,078,864 | A | 1/1992 | Whittier | 210/137 |
| 5,084,168 | A | 1/1992 | Woog | 210/202 |
| 5,085,766 | A | 2/1992 | Born | 210/150 |
| 5,092,990 | A | 3/1992 | Muramatsu et al. | 210/136 |
| 5,102,542 | A | 4/1992 | Lawrence et al. | 210/264 |
| 5,106,501 | A | 4/1992 | Yang et al. | 210/266 |
| 5,126,043 | A | 6/1992 | Giordano et al. | 210/249 |
| 5,149,437 | A | 9/1992 | Wilkinson et al. | 210/665 |
| 5,160,038 | A | 11/1992 | Harada et al. | 210/149 |
| 5,164,085 | A | 11/1992 | Spokoiny et al. | 210/256 |
| 5,174,901 | A | 12/1992 | Smith | 210/652 |
| 5,178,768 | A | 1/1993 | White, Jr. | 210/663 |
| 5,183,546 | A | 2/1993 | Oren et al. | 204/290 R |
| 5,189,092 | A | 2/1993 | Koslow | 524/495 |
| 5,198,114 | A | 3/1993 | Lewis et al. | 210/610 |
| 5,211,851 | A | 5/1993 | Meurer | 210/670 |
| 5,212,131 | A | 5/1993 | Belding | 502/60 |
| 5,215,690 | A | 6/1993 | Golino et al. | 264/29.6 |
| 5,223,150 | A | 6/1993 | Bundy et al. | 210/765 |
| 5,225,073 | A | 7/1993 | Billiet et al. | 210/121 |
| 5,225,078 | A | 7/1993 | Polasky et al. | 210/264 |
| 5,228,995 | A | 7/1993 | Stover | 210/603 |
| 5,238,569 | A | 8/1993 | Soria et al. | 210/500.27 |
| 5,248,424 | A | 9/1993 | Cote et al. | 210/636 |
| 5,249,948 | A | 10/1993 | Koslow | 425/376.1 |
| 5,252,206 | A | 10/1993 | Gonzalez | 210/282 |
| 5,256,299 | A | 10/1993 | Wang et al. | 210/664 |
| 5,266,215 | A | 11/1993 | Engelhard | 210/748 |
| 5,269,919 | A | 12/1993 | von Medlin | 210/256 |
| 5,281,309 | A | 1/1994 | Greene | 202/181 |
| 5,300,234 | A | 4/1994 | Oechsle et al. | 210/778 |
| 5,308,482 | A | 5/1994 | Mead | 210/207 |
| 5,310,488 | A | 5/1994 | Hansen | 210/674 |
| 5,322,622 | A | 6/1994 | Chiang | 210/169 |
| 5,331,037 | A | 7/1994 | Koslow | 524/496 |
| 5,336,413 | A | 8/1994 | van Staveren | 210/650 |
| 5,356,852 | A | 10/1994 | DeLiso et al. | 502/402 |
| 5,376,262 | A | 12/1994 | Guile | 502/62 |
| 5,389,325 | A | 2/1995 | Bookbinder et al. | 264/177.12 |
| 5,407,573 | A | 4/1995 | Hughes | 210/266 |
| 5,413,773 | A | 5/1995 | Tibbetts et al. | 423/447.3 |
| 5,431,706 | A | 7/1995 | Paas | 55/342 |
| 5,451,554 | A | 9/1995 | Guile et al. | 502/80 |
| 5,456,831 | A | 10/1995 | Sullivan | 210/266 |
| 5,464,531 | A | 11/1995 | Greene | 202/181 |
| 5,521,008 | A | 5/1996 | Lieberman et al. | 428/367 |
| 5,536,395 | A | 7/1996 | Kuennen et al. | 210/87 |
| 5,538,545 | A | 7/1996 | Dauber et al. | 96/153 |
| 5,538,923 | A | 7/1996 | Yan et al. | 502/424 |
| 5,543,096 | A | 8/1996 | Wu | 264/63 |
| 5,545,315 | A | 8/1996 | Lonneman | 210/120 |
| 5,545,323 | A | 8/1996 | Koehler et al. | 210/493.2 |
| 5,552,046 | A | 9/1996 | Johnston et al. | 210/266 |
| 5,554,288 | A | 9/1996 | Rydell et al. | 210/504 |
| 5,562,824 | A | 10/1996 | Magnusson | 210/266 |
| 5,565,097 | A | 10/1996 | Hayday | 210/167 |
| 5,567,322 | A | 10/1996 | Rundle et al. | 210/455 |
| 5,569,380 | A | 10/1996 | Sullivan | 210/266 |
| 5,580,770 | A | 12/1996 | DeFilippi | 435/180 |
| 5,584,997 | A | 12/1996 | Yagihashi et al. | 210/321.79 |
| 5,593,626 | A | 1/1997 | Yagishita | 264/122 |
| 5,595,659 | A | 1/1997 | Huang et al. | 210/502.1 |
| 5,609,759 | A | 3/1997 | Nohren, Jr. et al. | 210/266 |
| 5,626,761 | A | 5/1997 | Howery et al. | 210/651 |
| 5,635,063 | A | 6/1997 | Rajan et al. | 210/266 |
| 5,655,212 | A | 8/1997 | Sekhar et al. | 428/552 |
| 5,656,069 | A | 8/1997 | Nikolskaja et al. | 96/4 |
| 5,656,168 | A | 8/1997 | Millares | 210/490 |
| 5,681,463 | A | 10/1997 | Shimizu et al. | 210/266 |
| 5,685,986 | A | 11/1997 | Yamada et al. | 210/496 |
| 5,695,646 | A | 12/1997 | Graf | 210/716 |
| 5,698,091 | A | 12/1997 | Kuennen et al. | 210/87 |
| 5,718,889 | A | 2/1998 | Mizobuchi et al. | 424/65 |
| 5,744,421 | A | 4/1998 | Robinson et al. | 502/416 |
| 5,750,026 | A | 5/1998 | Gadkaree et al. | 210/502.1 |
| 5,759,394 | A | 6/1998 | Rohrbach et al. | 210/264 |
| 5,767,060 | A | 6/1998 | Hanrahan | 210/502.1 |
| 5,776,333 | A | 7/1998 | Plester et al. | 210/104 |
| 5,780,126 | A | 7/1998 | Smith et al. | 428/34.5 |
| 5,820,967 | A | 10/1998 | Gadkaree | 428/116 |
| 5,830,360 | A | 11/1998 | Mozayeni | 210/651 |
| 5,833,935 | A | 11/1998 | Malchesky | 422/300 |
| 5,846,603 | A | 12/1998 | Miller | 427/244 |
| 5,846,639 | A | 12/1998 | Robinson et al. | 428/304.4 |
| 5,853,572 | A | 12/1998 | Kuennen et al. | 210/87 |
| 5,855,788 | A | 1/1999 | Everhart et al. | 210/653 |
| 5,868,933 | A | 2/1999 | Patrick et al. | 210/484 |
| 5,870,945 | A | 2/1999 | Bivens | 99/408 |
| 5,882,531 | A | 3/1999 | Cohen | 210/793 |
| 5,888,403 | A | 3/1999 | Hayashi | 210/695 |
| 5,904,854 | A | 5/1999 | Shmidt et al. | 210/686 |
| 5,906,743 | A | 5/1999 | Cohen et al. | 210/502.1 |
| 5,914,294 | A | 6/1999 | Park et al. | 502/417 |
| 5,922,803 | A | 7/1999 | Koslow et al. | 524/496 |
| 5,928,588 | A | 7/1999 | Chen et al. | 264/113 |
| 5,935,442 | A | 8/1999 | Lihme et al. | 210/656 |
| 5,948,398 | A | 9/1999 | Hanamoto et al. | 424/76.1 |
| 5,957,339 | A | 9/1999 | Deni et al. | 222/190 |
| 5,972,253 | A | 10/1999 | Kimber | 264/29.7 |
| 5,997,829 | A | 12/1999 | Sekine et al. | 423/210 |
| 6,001,238 | A | 12/1999 | Takayasu et al. | 205/742 |
| 6,001,249 | A | 12/1999 | Bailey et al. | 210/232 |
| 6,013,181 | A | 1/2000 | Thellmann | 210/266 |
| 6,034,010 | A | 3/2000 | Cartwright et al. | 442/417 |
| 6,107,354 | A | 8/2000 | Shaniuk et al. | 521/28 |
| 6,110,479 | A | 8/2000 | Blaney et al. | 424/402 |
| 6,136,189 | A | 10/2000 | Smith et al. | 210/266 |
| 6,139,739 | A | 10/2000 | Hamlin et al. | 210/315 |
| 6,171,373 | B1 | 1/2001 | Park et al. | 95/138 |
| 6,180,016 | B1 | 1/2001 | Johnston et al. | 210/767 |
| 6,187,192 | B1 | 2/2001 | Johnston et al. | 210/502.1 |
| 6,187,713 | B1 | 2/2001 | Gadkaree | 502/425 |
| 6,197,193 | B1 | 3/2001 | Archer | 210/266 |
| 6,207,264 | B1 | 3/2001 | Robinson et al. | 428/304.4 |
| 6,221,416 | B1 | 4/2001 | Nohren, Jr. | 426/394 |
| 6,238,575 | B1 | 5/2001 | Patil | 210/764 |
| 6,241,893 | B1 | 6/2001 | Levy | 210/660 |
| 6,245,228 | B1 | 6/2001 | Kelada | 210/206 |
| 6,257,242 | B1 | 7/2001 | Stavridis | 131/344 |
| 6,258,266 | B1 | 7/2001 | Riback et al. | 210/234 |
| 6,264,830 | B1 | 7/2001 | Plester et al. | 210/85 |
| 6,267,887 | B1 | 7/2001 | Hughes et al. | 210/266 |
| 6,284,705 | B1 | 9/2001 | Park et al. | 502/417 |
| 6,290,848 | B1 | 9/2001 | Tanner et al. | 210/266 |
| 6,299,771 | B1 | 10/2001 | Shmidt et al. | 210/263 |
| 6,312,588 | B1 | 11/2001 | Conrad et al. | 210/85 |
| 6,312,595 | B1 | 11/2001 | Chien | 210/223 |
| 6,332,916 | B1 | 12/2001 | Chinn et al. | 95/128 |
| 6,340,402 | B1 | 1/2002 | Lucarelli et al. | 156/92 |
| 6,348,155 | B1 | 2/2002 | Conway et al. | 210/668 |
| 6,368,504 | B1 | 4/2002 | Kuennen et al. | 210/315 |
| 6,379,539 | B1 | 4/2002 | Ubelhor | 210/104 |
| 6,383,395 | B1 | 5/2002 | Clarke et al. | 210/683 |
| 6,391,191 | B2 | 5/2002 | Conrad | 210/94 |
| 6,398,965 | B1 | 6/2002 | Arba et al. | 210/652 |
| 6,405,875 | B1 | 6/2002 | Cutler | 210/477 |
| 6,416,673 | B2 | 7/2002 | Plester et al. | 210/737 |
| 6,446,814 | B1 | 9/2002 | King | 210/501 |
| 6,447,720 | B1 | 9/2002 | Horton, III et al. | 422/24 |
| 6,447,721 | B1 | 9/2002 | Horton, III et al. | 422/24 |

| | | | | | | |
|---|---|---|---|---|---|---|
| 6,451,202 B1 | 9/2002 | Kuennen et al. ............ 210/136 | WO | WO 92/00799 | 1/1992 |
| 6,451,211 B1 | 9/2002 | Plester et al. ............... 210/709 | WO | WO 93/23142 | 11/1993 |
| 6,475,386 B1 | 11/2002 | Carr et al. .................. 210/266 | WO | WO 97/22631 | 6/1997 |
| 6,485,546 B2 | 11/2002 | Fuchs ......................... 96/135 | WO | WO 01/07090 | 2/2001 |
| 6,497,817 B1 | 12/2002 | Liang ........................ 210/232 | WO | WO 01/81250 | 11/2001 |
| 6,514,413 B2 | 2/2003 | Pimenov et al. ............ 210/668 | WO | WO 02/48032 | 6/2002 |
| 2002/0125187 A1 | 9/2002 | Tanner et al. ............... 210/418 | WO | WO 02/068335 | 9/2002 |
| 2002/0134715 A1 | 9/2002 | Tanner et al. ................ 210/85 | WO | WO 02/070104 | 9/2002 |
| | | | WO | WO 02/074143 | 9/2002 |
| | | | WO | WO 02/074144 | 9/2002 |

FOREIGN PATENT DOCUMENTS

JP        2000256999 A  *  9/2000

* cited by examiner

Fig. 5

| Unit ID | Influent | Blank | Filter-A | Filter-B | Filter-C | Filter-D | Filter-E | Filter-F | Filter-G |
|---|---|---|---|---|---|---|---|---|---|
| | | | | | Log Reductions | | | | |
| Day 1 Gallons | | | | | | | | | |
| 0 | 4.755 | 3.49 | >4.755 | >4.755 | >4.755 | >4.755 | >4.755 | >4.755 | >4.755 |
| 30 (25%) | 4.311 | 1.444 | >4.311 | >4.311 | >4.311 | >4.311 | >4.311 | >4.311 | >4.311 |
| 60 (50%) | 2.91 | 0.246 | >2.91 | >2.91 | >2.91 | >2.91 | >2.91 | >2.91 | >2.91 |
| Day 2 stagnation* | 0 | 0 | 0 | 0 | 0 | 0 | 0 | 0 | 0 |
| 90 (75%) | 4.378 | 0.238 | >4.378 | >4.378 | >4.378 | >4.378 | >4.378 | >4.378 | >4.378 |
| 120 (100%) | 4.517 | 0.098 | >4.517 | >4.517 | >4.517 | >4.517 | >4.517 | 3.175 | >4.517 |

*no MS-2 was recovered from any of the samples collected immediately after a 48-h stagnation period

| | %binder | %Mg(OH)2 | %carbon | Mg/carbon | pressure drop | %comp. | cation x pressure drop |
|---|---|---|---|---|---|---|---|
| Filter-A | 25 | 37.5 | 37.5 | 1:1 | 4.15 | 15 | 0.375 x 0.417 x 4.15 = 0.649 |
| Filter-B | 27 | 36.5 | 36.5 | 1:1 | 5.95 | 15 | 0.365 x 0.417 x 5.95 = 0.906 |
| Filter-C | 30 | 35 | 35 | 1:1 | 5.20 | 15 | 0.350 x 0.417 x 5.20 = 0.759 |
| Filter-D | 25 | 30 | 45 | 1:1.5 | 4.60 | 15 | 0.300 x 0.417 x 4.60 = 0.576 |
| Filter-E | 27 | 29 | 44 | 1:1.5 | 5.00 | 15 | 0.290 x 0.417 x 5.00 = 0.605 |
| Filter-F | 27 | 29 | 44 | 1:1.5 | 4.05 | 10 | 0.290 x 0.417 x 4.05 = 0.490 |
| Filter-G | 30 | 28 | 42 | 1:1.5 | 5.05 | 10 | 0.280 x 0.417 x 5.05 = 0.590 |

Flow rate

| Unit ID | Blank | Filter-A | Filter-B | Filter-C | Filter-D | Filter-E | Filter-F | Filter-G |
|---|---|---|---|---|---|---|---|---|
| Day 1 | | | | | | | | |
| 0 | 0.83 | 0.34 | 0.32 | 0.42 | 0.4 | 0.42 | 0.39 | |
| 30 | 0.83 | 0.36 | 0.36 | 0.45 | 0.47 | 0.44 | 0.45 | |
| 60 | 0.83 | 0.39 | 0.38 | 0.49 | 0.52 | 0.5 | 0.47 | |
| Day 2 | | | | | | | | |
| 60 | 0.81 | 0.35 | 0.33 | 0.45 | 0.45 | 0.48 | 0.44 | |
| 90 | 0.81 | 0.35 | 0.34 | 0.43 | 0.49 | 0.54 | 0.45 | |
| 120 | 0.83 | 0.34 | 0.36 | 0.44 | 0.5 | 0.53 | 0.44 | |
| | 0.82 | 0.36 | 0.35 | 0.45 | 0.47 | 0.50 | 0.44 | |

MICROORGANISM-REMOVING FILTER MEDIUM HAVING HIGH ISOELECTRIC MATERIAL AND LOW MELT INDEX BINDER

FIELD OF THE INVENTION

The present invention relates to filtration materials, and more particularly, this invention relates to a filter medium having enhanced microorganism-removing properties.

BACKGROUND OF THE INVENTION

The use of home water treatment systems to treat tap water continues to grow dramatically in the U.S. and abroad, in part because of heightened public awareness of the health concerns associated with the consumption of untreated tap water. Of particular concern are pathogens, which are microbes that cause disease. They include a few types of bacteria, viruses, protozoa, and other organisms. Some pathogens are often found in water, frequently as a result of fecal matter from sewage discharges, leaking septic tanks, and runoff from animal feedlots into bodies of water from which drinking water is taken. Bio-terrorism also poses a significant threat to water supplies.

Total Coliforms are a group of closely related bacteria that live in soil and water as well as the gut of animals. The extent to which total coliforms are present in the source water can indicate the general quality of that water and the likelihood that the water is fecally contaminated. Specific types of coliforms (i.e., fecal coliforms or *E. coli*) can present serious health risks. The Environmental Protection Agency (EPA) has set forth minimum standards for acceptance of a device proposed for use as a microbiological water purifier. Devices that claim removal of coliforms, represented by the bacteria *E. coli* and *Klebsiella Terregina*, must show a minimum 6-log reduction, 99.9999% of organisms removed, from an influent concentration of $1\times10^7$/100 ml.

*Cryptosporidium* is a single-celled microbe contained in a group generally known as protozoa. *Cryptosporidium* may cause a disease, cryptosporidiosis, when ingested. Cryptosporidiosis symptoms can range from mild stomach upset to life threatening disease in those who are immunocompromised (e.g., people with severely compromised immune systems). Oocysts are a stage in the life-cycle of some *Cryptosporidium*. In this stage, the *Cryptosporidium* can infect humans and other animals. The EPA requires removal of at least 99% of *Cryptosporidium* from water for qualified devices.

*Giardia lamblia* (commonly referred to as *Giardia*) are single-celled microbes contained in a group known as protozoa. When ingested, they can cause a gastrointestinal disease called giardiasis. Giardiasis is a frequent cause of diarrhea. Symptoms may include diarrhea, fatigue, and cramps. Waterborne giardiasis may occur as a result of disinfection problems or inadequate filtration procedures. Cysts are a stage in the life-cycle of some *Giardia*. In this stage, the *Giardia* can infect humans and other animals. Devices that claim cyst removal must show a minimum 3 log reduction, 99.9% of cysts removed, from an influent concentration of $1\times10^7$/L.

Viruses, including hepatitis A virus, rotaviruses, and Norwalk and other caliciviruses, are microbes that can cause serious illness. The EPA requires water purifiers to ensure a 4 log reduction, 99.99% of viruses removed, from an influent concentration of $1\times10^7$/L.

Two types of systems exist for the filtration of tap water. One type is pressurized, such as a faucet-mount system, and typically uses a porous carbon block as part of the filtration system. The other type is a low pressure system, such as a pitcher filter system, and typically uses activated carbon granules as part on the filtration system. However, few filtration materials are able to meet EPA standards for more than a few liters of water with filters of a reasonable size.

We have surprisingly found that a synergistic effect occurs when inorganic materials with high isoelectric points, such as magnesium salts, and activated carbon are bound by a low melt index binder. The resulting filter medium is very effective at removing microorganisms from large quantities of water, in filters small enough for point-of-use systems.

Magnesium salts have been used to remove polar materials from non-polar liquids by filtration. For example, U.S. Pat. No. 6,338,830 to Moskovitz and Kepner describes the use of Group IIA, Group IIIA, Goup IVA, Group VA and transition metal oxide to remove contaminants from non-aqueous liquid or gas streams.

U.S. patent application No. 2002/0050474 to Munson and Roberts describes the use of magnesium silicate to remove polar impurities from used cooking oils.

Magnesium ions have also been used to promote cell survival. For example, U.S. Pat. No. 6,096,216 to Shanbrom describes the use of magnesium salts to preserve biological fluids during filtration through iodinated resin. U.S. patent application No. 2002/0053537 to Lucido and Shaffer describes the use of magnesium as a nutrient to feed microorganisms in a bioreacter.

International Patent Application WO 01/07090 to Hou et al. describes cationic polymers attached to substrates, including carbon blocks, for removing microorganisms.

Some prior art filters use biocidal resins and peroxides to kill microorganisms. For example, U.S. Pat. No. 4,361,486 to Hou and Webster describes the use of magnesium peroxide to oxidize soluble iron and inactivate microorganisms. A drawback to such filters is that the biocidal agent as well as the dead microorganisms pass through the filter and into the drinking water.

International Patent Application WO 02/076577 to Hughes broadly describes the use of magnesium compounds in carbon block form to remove microorganisms from a fluid, and is herein incorporated by reference. The purification material disclosed in Application WO 02/076577 removes microorganisms from fluids through adsorption to the magnesium compound. However, because the magnesium containing material only represents a small percentage of the surface area exposed to the fluid, the sites to which microorganisms can become adsorbed are few. Thus, the efficiency of the filter is limited, in that many microorganisms are not captured but merely pass through the filter. In addition, the adsorption sites quickly fill up, making adsorption difficult if not impossible and/or resulting in clogging of the filter pores ultimately resulting in a short filter life. For example, Application WO 02/076577 only discloses the ability to remove microorganisms from 500 ml of water. Moreover, the filter disclosed in Application WO 02/076,577 is very large, with an outer diameter of 2.5 inches, an inner diameter of 1.25 inches, and length of 9.8 inches, making it unsuitable for many point-of-use purposes and in portable devices.

U.S. Pat. Nos. 4,753,728 and 5,017,318 to Vanderbilt et al. describe a filter constructed of powdered activated carbon bound by an ultra high molecular weight polyethylene binder, but which is only capable of capturing insignificant quantities of microorganisms.

U.S. patent application No. US 2003/0038084 to Mitchell et al. describes a filter composed of carbon particles heated in an oven in an atmosphere of ammonia that purportedly removes microorganisms through a combination of capturing fimbriae and surface polymers of the microorganisms in pores on the surface of the particular carbon particle, by adsorption and size exclusion.

What is needed is a more efficient filter medium capable of removing microorganisms to EPA standards from substantially larger quantities of water per unit filter medium than was heretofore possible.

SUMMARY OF THE INVENTION

The present invention solves the problems described above by providing a filter medium capable of removing a large percentage of microorganisms from a fluid such as water. The filter medium includes particles of activated carbon (e.g., granular activated carbon (GAC), powdered activated carbon, etc.). The filter medium also has particles of a substantially insoluble inorganic material having an isoelectric point greater than the pH of the fluid being filtered, preferably above about 7.0 pH, more preferably greater than 9.0 pH, and even more preferably greater than 10.0 pH. A binder binds the particles of activated carbon and particles of inorganic material. The binder has a melt index of less than about 1 gram per 10 minutes as determined by ASTM D1238 at 190 degrees C. and 15 kilograms load, such that the binder will become tacky at elevated temperatures without becoming sufficiently liquid to substantially wet the particles of activated carbon and inorganic material. When water at a pH less than the isoelectric point of the inorganic material is passed through the filter, the high-isoelectric-point inorganic material imparts a positive charge on the filter surface, thereby attracting and adsorbing negatively charged microorganisms to the filter surface by electrostatic forces.

In one embodiment, the inorganic material is present in an amount ranging from about 25 weight percent to about 45 weight percent of the total weight of the filter medium. A preferred inorganic material is a magnesium compound such as magnesium hydroxide or magnesium oxide.

The binder is preferably an ultra high molecular weight polymer having a molecular weight greater than about 4 million. For example, the binder can be ultra high molecular weight polyethylene. Ideally, the melt index of the binder is less than about 0.1 grams per 10 minutes as determined by ASTM D 1238 at 190 degrees C. and 15 kilograms load. In one embodiment, the binder is present in an amount ranging from about 20 weight percent to about 35 weight percent of the total weight of the filter medium.

Note that additional adsorptive and/or binding materials may be added other than the activated carbon, inorganic material, and binder to alter the properties of the filter.

In one embodiment, 75 grams of the filter medium performs a greater than $1 \times 10^4$ plaque forming units/milliliter reduction of viruses in 100 gallons of water passing through the filter medium.

The mean pore size of pores formed by the particles and binder is preferably between 0.01 micron and 10 microns, and ideally between 0.1 micron and 1 microns.

The filter medium can be shaped into any desired form, such as in the form of a block or sheet. For example, the filter medium can be cylindrically shaped with an outer diameter of less than about 4 inches and a maximum length between ends of the filter medium of less than about 3 inches.

The filter medium can be formed by mixing particles of activated carbon, particles of inorganic material, and the binder. The mixture is heated such that the binder becomes tacky without becoming sufficiently liquid to substantially wet the particles of activated carbon and inorganic material. The heated mixture is compressed to control the size of the pores formed by the particles and binder to a mean pore size of between about 0.01 micron and about 10 microns, preferably between about 0.05 and about 5 microns, and ideally between about 0.1 and about 1 microns.

The filter medium is adaptable for use in a filtration device having a housing. The filtration device may be of the type adapted to be mounted to a water source, a pitcher, a bottle, etc. A pump can be coupled to the housing for controlling the flow of the fluid through the filter medium.

The embodiments described herein have particular applicability for countering a bioterrorism act, by enabling removal of potentially life-threatening microbials introduced into a water supply by a terrorist.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a table showing the results of seven experiments testing the removal of bacteriophage MS-2 by cylindrically shaped filter media with varying concentrations of carbon, binder and magnesium hydroxide.

BEST MODES FOR CARRYING OUT THE INVENTION

Figure 1:
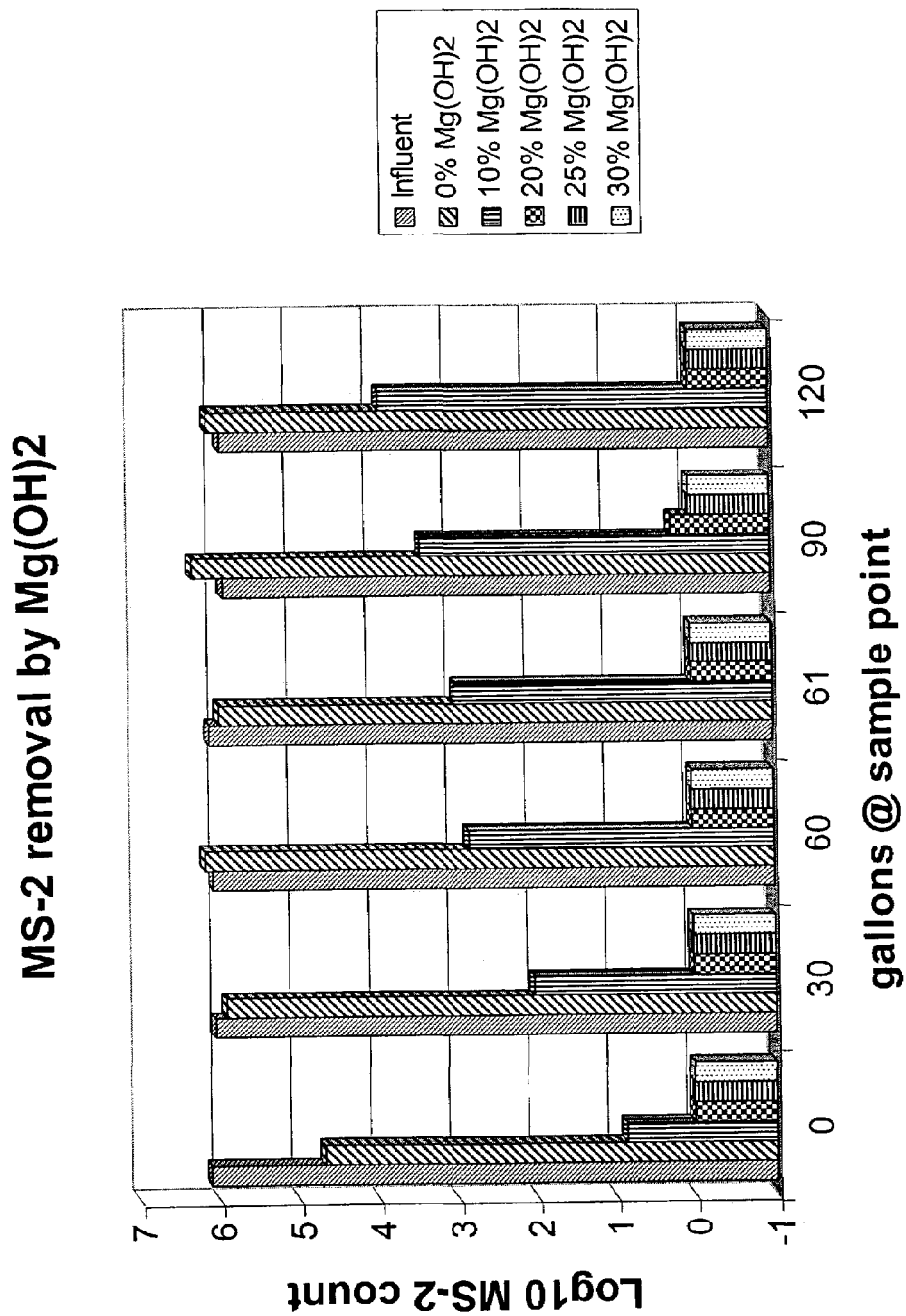
FIG. 1 is a chart showing the microorganism-removing capabilities of filter media having varying the concentration of magnesium hydroxide

The following description includes the best embodiments presently contemplated for carrying out the present invention. This description is made for the purpose of illustrating the general principles of the present invention and is not meant to limit the inventive concepts claimed herein.

The present invention provides a filter medium capable of removing microorganisms (bacteria, viruses, cysts, etc.) from large quantities of water, and in compliance with the EPA standards mentioned above. The inventors have surprisingly found that a synergistic effect occurs when inorganic materials with high isoelectric points and activated carbon are bound by a low melt index binder.

While not wishing to be bound by any particular theory, it is believed that the high-isoelectric-point inorganic material tends to adhere to the surface of the binder and possibly the carbon as well, and acts as an adsorption-enhancing material that imparts a positive charge on the surface of the pores of the filter medium when in the presence of a fluid having a pH lower than the isoelectric point of the inorganic material. Most microorganisms of concern have a negative surface charge. For example, most types of bacteria have a membrane layer of phospholipids that give the bacteria a negative charge. When negatively charged viruses and bacteria pass through the pores of the filter medium, they are attracted to the positively charged surface of the filter medium and become adsorbed to the surface by electrostatic interactions. Because most, if not all, of the surfaces of the pores themselves become charged, the filter medium has more charged sites with which to adsorb microorganisms, as well as an overall increase in electrostatic forces. Thus, the filter medium is able to remove substantially more microorganisms per unit weight of filter medium and/or per unit volume of filter medium than was heretofore possible.

As mentioned above, the adsorption-enhancing inorganic material has a high isoelectric point. A high isoelectric point is preferred, because if a fluid having the same or higher pH as the inorganic material is introduced to the filter medium, the microorganisms adsorbed to the filter medium will become detached and exit the filter. Thus, the "high isoelectric point" of the inorganic material is above a threshold pH suitable for the desired use. In other words, the isoelectric point of the inorganic material should be higher than the pH of the fluid being filtered. One skilled in the art will understand that the pH of the fluid to be filtered can be readily determined. For example, if the fluid is water with a pH varying from 6.9 to 7.1, the isoelectric point of the inorganic material should be higher than 7.1. For commercial filters, a higher isoelectric point may be required. For example, one test protocol of the EPA requires washing the filter with water having a pH of 9.0. The filter media disclosed in the EXAMPLES section below do not lose microorganisms under these conditions.

In one embodiment of the invention, a granular filter medium capable of removing microorganisms from a fluid contains particles of activated carbon and particles of a substantially insoluble inorganic material having an isoelectric point greater than about 9.0 pH.

The term "particles" as used herein can refer to particles of any shape, as well as short pieces of strands or fibers, hollow or porous particles, etc. The term "fluid" includes aqueous fluids such as water, or gases and mixtures of gases.

A preferred method of making the filter medium is by mixing and heating particles of activated carbon, particles of inorganic material, and particles of binder in a mold of the desired shape, then compressing the mixture to encourage binding and to adjust the pore size. A preferred range of compression is between about 1 percent to about 30 percent reduction of the volume of the filter medium. This method is described in more particularity in the EXAMPLES section below, but is presented briefly here to provide a context for the following description.

The pore size of the filter medium is important, as it is desirable to place the microorganism in close proximity to the adsorbent surface of the filter medium. In general, the smaller the pore size, the more readily the microorganisms become adsorbed to the surface of the filter medium. This is because as pore size decreases, the microorganisms come into closer proximity to the adsorptive surface as they pass with the fluid through the pores of the filter medium. The pore size is preferably small enough to physically filter out more oocysts (e.g., *cryptosporidium*) and cysts (e.g., *Giardia muris* and *Giardia lamblia*) than required by the EPA standards discussed above. A preferred range of mean pore sizes is 0.01 to 10 microns. More preferably, the mean pore size of the filter medium is within the range 0.1 to 1 microns.

The term "low melt index binder" preferably refers to binders that have very low to virtually no melt index (melt flow rate), meaning that when heated the binders will become tacky at elevated temperatures without becoming sufficiently liquid to significantly wet the surfaces of the carbon particles and the particles of inorganic material, i.e., will not flow. The use of a low melt index binder in the present invention maximizes the effectiveness of the inorganic material. Because the binder becomes tacky rather than fluid, the activated carbon and inorganic material adhere to the surface of the binder rather than becoming encased in the binder during formation of the filter medium into its final shape. This maximizes the exposed surface area of the activated carbon and inorganic material, and thus their effectiveness.

The melt flow rate or melt index is determined by ASTM D1238 or DIN 53735 at 190 degrees C. and 15 kilograms. The amount of material that flows through the die should be less than about 1 gram/10 minutes, more preferably less than 0.5 grams/10 minutes and ideally less than 0.1 gram/10 minutes. The most preferred binder is an ultra high molecular weight, high density polyethylene. The high molecular weight gives rise to the restricted flow properties of the melted material which is so important to this aspect of the invention. The following table shows a comparison of selected properties of the ultra high molecular weight, high density polyethylene with other types of polyethylene binders.

TABLE 1

Binders for carbon blocks

| | Melt Temp. (° C.) | Melt index* (° C.) |
|---|---|---|
| LDPE[a] | 102–110 | 5–70 |
| HDPE[b] | 134 | 10.5 |
| VHMWPE[c] | 135 | 1.8 |
| UHMWPE[d] | 135 | <0.1 |

*The melt index of a material is measured at 190° C. with a 15 Kg weight and the units are in grams/10 minutes.
[a]Low Density Polyethylene
[b]High Density Polyethylene
[c]Very High Molecular Weight Polyethylene
[d]Ultra High Molecular Weight Polyethylene The temperature at which the most preferred binder becomes sufficiently tacky to adhere to the carbon particles may vary depending on the specific polymer used. With the high molecular weight, high density polyethylene, the binder and carbon particles can be processed at a temperature of from about 175 degrees C. to about 205 degrees C. for about 2 hours.

The percentage of binder used to bind the activated carbon and inorganic material is preferably in the range of about 10 to about 40 weight percent, more preferably in the range of about 20 to about 35 weight percent, and most preferably about 25 to about 30 percent by weight based on the total weight of the filter medium. These ranges provide enough binder to hold the particles of carbon and inorganic material together, while not blocking the surface pores of the carbon particles.

The binder is preferably utilized in particulate or powder form so that it can be uniformly mixed and dispersed with the carbon particles. The use of the preferred polymer binders allows one to bind the particles of carbon and inorganic material together without excessively wetting the particles when melted and thereby effectively occluding much of the surface area of the particles.

A preferred mean particle size of the binder is in the range from about 120 microns to about 140 microns. Note, however, that the mean particle size of the binder used is not critical and can be made larger or smaller based on the desired properties of the filter medium. For example, smaller particle size can be used to make the pore size smaller with a resultant increase in contaminants captured and reduction in flow rate.

The preferred carbon is powdered activated carbon with a mean particle size (outer diameter) in the range of about 80 to about 120 microns, and ideally in the range of about 90 to about 110 microns, and most ideally at about 100 microns. Note, however, that the mean particle size of the carbon used is not critical and can be made larger or smaller based on the desired properties of the filter medium. For example, smaller particle size carbon can be used to make the pore size smaller with a resultant increase in contaminants captured and reduction in flow rate.

The percentage of carbon in the filter medium is preferably in the range of about 30 to about 50 weight percent, more preferably in the range of about 37.5 to about 45 weight percent, and most preferably about 40 to about 45 percent by weight based on the total weight of the filter medium.

As mentioned above, we have surprisingly found that a synergistic effect occurs when substantially insoluble inorganic materials with high isoelectric points and activated carbon are bound by a low melt index binder. Preferred inorganic materials have an isoelectric point above 7 pH, more preferably above 9 pH, and ideally above 10 pH.

The percentage of inorganic material in the filter medium is preferably in the range of about 10 to about 50 weight percent, more preferably in the range of about 25 to about 45 weight percent, and most preferably about 28 to about 40 percent by weight based on the total weight of the filter medium.

The following table lists several insoluble inorganic materials that can be implemented in the filter medium of the present invention. Note that the inorganic materials can be added to the filter medium individually or in combination with each other.

TABLE 2

Insoluble inorganic materials

| Compound | Isoelectric point |
|---|---|
| Magnesium hydroxide, $Mg(OH)_2$ | 10.5 |
| Magnesium oxide, MgO | 12.5 |
| Titanium dioxide, $TiO_2$ | 6.6–8.9 |
| Zirconium dioxide, $ZrO_2$ | 6.7–7.4 |
| Aluminum oxide, $Al_2O_3$ | 6.8–9.2 |
| Barium oxide, BaO | 13.3 |
| Calcium oxide, CaO | 12.9 |
| Cesium oxide, $Ce_2O_3$ | 9.8 |
| Iron (II) oxide, FeO | 11.8 |
| Iron (III) oxide, $Fe_2O_3$ | 9.3 |
| Zirconium oxide, $ZrO_2$ | 11.3 |
| Hydroxyapatite, $Ca_5(HPO_4)_3OH$ | <6.9 |
| Chromium oxide, $Cr_2O_3$ | 9.2 |
| Cobalt oxide, $Co_3O_4$ | 8–9 |
| Chrysotile asbestos, $Mg_3Si_2O_5(OH)_4$ | >7 |

The preferred inorganic materials are magnesium compounds with an isoelectric point above 9 pH, and more preferably above 10 pH, such as magnesium hydroxide and magnesium oxide. The most preferred material is magnesium hydroxide, as it is non-toxic to humans and exhibits superior adsorptive properties. A preferred mean particle size for magnesium hydroxide is in the range of about 5 to about 14 microns, but again, larger or smaller particle sizes can be used.

The following table illustrates how varying the concentration of magnesium hydroxide in the filter medium affects the microorganism-removing capacity of the filter medium. This experiment used carbon blocks tested with faucet mount system at 60 PSI. The composition of the carbon blocks included a 20 weight percent binder and the balance in activated carbon. As shown, even small amounts of magnesium hydroxide remove microorganisms. Increasing the amount of magnesium hydroxide in the filter medium improves its microorganism-removing properties. Note also that the log reduction flattens out at about a 30 weight percent concentration of magnesium hydroxide in this particular configuration.

TABLE 3

Removal of bacteriophage MS-2 by faucet mount filters with different concentrations of magnesium hydroxide

|   |   | 60 gal |
|---|---|---|
| C | 3.3% magnesium hydroxide | 1.7 log reduction |
| B | 15% magnesium hydroxide | 2.4 |
| D | 30% magnesium hydroxide | 3.8 |
| F | 40% magnesium hydroxide | 3.8 |
|   | Control - no magnesium hydroxide | 0.7 |

FIG. 1 is a chart 100 showing how varying the concentration of magnesium hydroxide in the filter medium affects the microorganism-removing capacity of the filter. This experiment used carbon blocks tested with faucet mount system at 60 PSI. The composition of the carbon blocks included 20 weight percent binder and the balance activated carbon. The influent liquid was water containing a 4.3 log ($1 \times 10^{4.3}$ PFU/ml) concentration of MS-2, where PFU=Plaque Forming Units. PFUs represent an estimate of the concentration of a bacteriophage solution, determined by mixing the bacteriophage with a solution of susceptible bacteria, plating, incubating, and counting the number of plaques present on the bacterial lawn, with each plaque representing a viable bacteriophage. For example, if a phage stock solution has 1010 PFU/ml, it means that every ml of this stock has 1010 phage particles which can form plaques.

As shown in FIG. 1, at 20 weight percent magnesium hydroxide and above, a 6 log reduction of MS-2 is still achieved after 120 gallons of contaminated water introduced to the filter. For filters with no magnesium hydroxide and 10 weight percent magnesium hydroxide, the effectiveness of the filter medium is inversely proportional to the volume of water filtered.

Table 4 (below) shows a relative comparison of the microorganism-removing capabilities of materials having different isoelectric points. As shown, the materials with higher isoelectric points removed significantly more MS-2 than materials with lower isoelectric points. The experiment was conducted by swirling the given amounts of the compounds in water spiked with approximately $9.0 \times 10^5$ PFU/ml of bacteriophage MS-2 for 5 minutes then filtered through a 0.45 micron syringe filter, previously treated with 5 ml of 1.5% beef extract solution (pH 7.2, 0.05 M glycine).

TABLE 4

Isoelectric point and MS-2 removal

| Mineral (grams tested) | Isoelectric point (pH) | Removal (Log reduction) |
|---|---|---|
| $Mg(OH)_2$ (2.0) | 10.5 | 4.9 |
| Magnesium silicate (5.0) | ~3 | 2.7 |

TABLE 4-continued

Isoelectric point and MS-2 removal

| Mineral (grams tested) | Isoelectric point (pH) | Removal (Log reduction) |
|---|---|---|
| MgO (2.0) | 12.5 | 3.68 |
| $MgCO_3$ (Magnetite) | 5.5 | N/A* |
| $Al_2O_3$ (2.0) | 9.4 | 2.71 |
| AlO(OH) (Boehemite) (5.0) | 9.7 | 4.67 |
| $Al2Si2O5(OH)4$ (Kaolinite) | 1.5–3.5 | N/A |
| $\alpha\text{-}Fe_2O_3$ (hematite) | 7.5 | N/A |
| FeO(OH) (2.0) | N/A | 2.49 |
| $Cr_2O_3$ | 9.2 | N/A |
| $SnO_2$ | 4.5 | N/A |
| $(CaF)Ca_4(PO_4)_3$ (Apatite) (5.5) | 4–6 | 3.08 |
| $TiO_2$ (2.1) | 6.6–8.9 | 0.96 |
| TiO(OH) (2.0) | N/A | 1.93 |
| $ZrO_2$ | 11.3 | N/A |
| Sepiolite (2.0) | N/A | 2.22 |
| Saponite (2.0) | N/A | 0.125 |

*Indicates data not gathered.

The following table shows the results of a batch study comparing the effectiveness of magnesium hydroxide to that of magnesium silicate. The experiment was conducted using 20 ml of water that was contaminated with MS-2 bacteriophage. 1, 3, or 5 grams of the material was added (as indicated below) to the contaminated water. The mixture was then mixed and the magnesium compound and filtered off to determine how much virus the material removed. As shown, magnesium hydroxide works significantly better than magnesium silicate, primarily because magnesium hydroxide has a higher isoelectric point and superior adsorptive properties.

TABLE 5

Removal of bacteriophage MS-2 by powdered magnesium silicate and magnesium hydroxide

| | MS-2 log 10 removal |
|---|---|
| 1 g magnesium silicate[a] | 2.0 |
| 5 g magnesium silicate[a] | 2.7 |
| 1 g magnesium hydroxide[b] | 2.9 |
| 3 g magnesium hydroxide[b] | 3.8 |
| 5 g magnesium hydroxide[b] | 4.4 |

[a]magnesium silicate was Cantal 45–85 from Cantal, a division of Highwood Resources, Ltd.
[b]magnesium hydroxide was from Nabaltec.

As mentioned above, magnesium oxide can also be used. Magnesium oxide hydrates in the presence of water, forming a magnesium hydroxide surface layer. However, starting with magnesium hydroxide as the adsorptive material results in better performance, in part because of the length of time for magnesium oxide to completely hydrate, and also because magnesium oxide is slightly soluble in water and so can wash out of the filter.

Additional materials having high isoelectric points include titanium dioxide, iron oxides, aluminum oxides, barium oxides, calcium phosphate and alumina-coated silica. Other magnesium-containing minerals include: antigorite, clinochrysotile, lizardite, orthochrysotile and parachrysotile, clinochore, hectabrite, vermiculite, ripidolite, saponite, and sepiolite.

Figure 2:
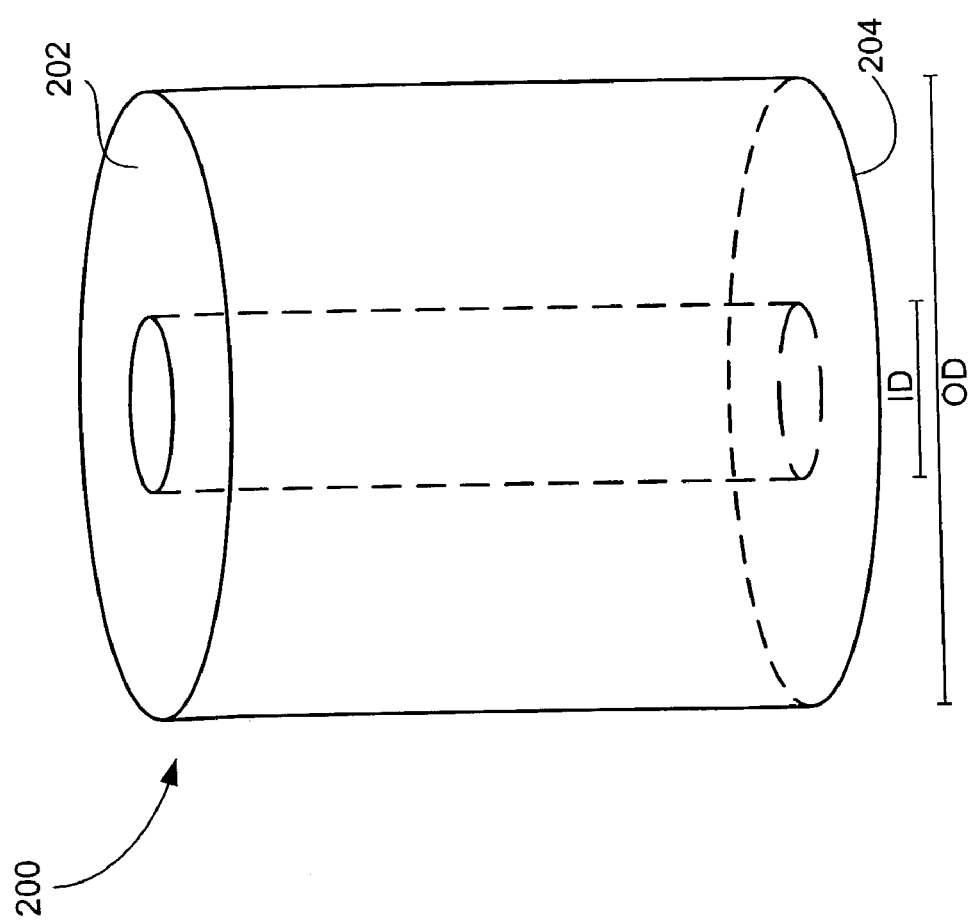
FIG. 2 illustrates a block of the filter medium in cylindrical form.

The filter medium can be created in virtually any desired shape. FIG. 2 illustrates a block 200 of the filter medium in cylindrical form, and which is particularly adapted to faucet mount systems such as the system found in U.S. Pat. No. 6,123,837 to Wadsworth et al. and to pitcher systems such as the system found in U.S. Pat. No. Des. 398,184 to Silverberg et al., each of which are herein incorporated by reference. A standard-sized cylindrical filter block for point-of-use systems is about 4 inches in length or less between the ends 202, 204 of the block 200, and has an outer diameter (OD) of less than about 4 inches and an inner diameter (ID) of less than about one inch. A preferred embodiment is less than about 3 inches in length and has an outer diameter of less than about 2.5 inches and an inner diameter of less than about 0.5 inch.

Figure 3:
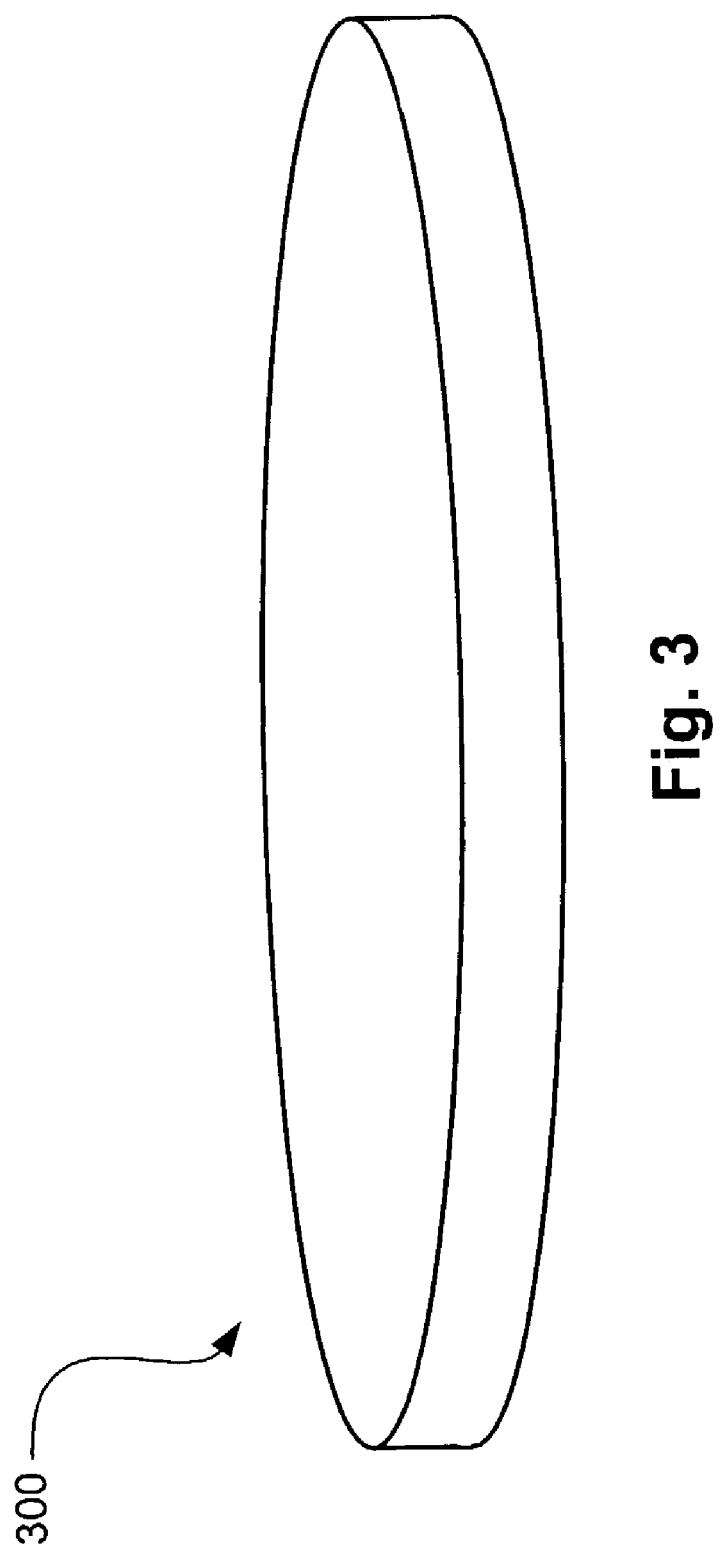
FIG. 3 illustrates the filter medium in the form of a sheet.

FIG. 3 illustrates the filter medium in the form of a sheet 300. The sheet 300 can then be placed in a housing and a fluid such as water passed therethrough.

The filter medium can be used in a wide variety of applications. As mentioned above, one use to which it is particularly adaptable is for pressurized and gravity-flow applications such as faucet-mount filters and pitcher filters. Other applications are use in granular filters, high volume "under-the-sink" or commercial-type filters, and refrigerator filters.

The filter medium can also be made for/used in portable applications, such as for use in filters for camping, bottles with filters, emergency kits, etc. The filter medium is also useful in med-evac systems, allowing filtration of water in the field to rehydrate soldiers. In portable uses, the filter medium can be formed in a block smaller than the cylindrical block disclosed above for 5, 15, 30 gallons, etc.

The filter medium would also be particularly effective at purifying water contaminated by an act of bio-terrorism. For example, the faucet-mount system could allow users to continue to use a contaminated public water supply until fresh water were made available. Similarly, portable versions (pitchers, bottles, bags, etc. with the filter medium attached) can be stored in homes and businesses, stored in emergency kits, carried in automobiles, etc. Further, such portable versions can be made available and/or distributed to people rather quickly in response to a bio-terrorism attack.

A hand-pump, foot-pump, battery-pump, solar-powered pump, etc. may be coupled to any of the embodiments described herein to pressurize the influent water and/or reduce pressure in the effluent stream to draw water through the filter medium.

EXAMPLES

Example 1

Following is an example of a preferred procedure for forming a porous block of filter medium. Granular activated carbon with a mean particle size (outer diameter) of about 100 microns is mixed with particles of an ultra high molecular weight polyethylene binder (and/or other binder) having a mean particle size in the range of about 120 to 140 microns, a melt index of less than 1, and a melting temperature of about 135° C. Particles of magnesium hydroxide (and/or other inorganic material) are blended into the mixture of carbon and binder. The preferred particle size of the magnesium hydroxide is in the range of about 5 to about 14 microns. See Table 6 and FIG. 5 for illustrative compositions of the mixture. The mixture of magnesium hydroxide, carbon, and binder are thoroughly mixed in a blender or other suitable mixing device for a period of time sufficient to create a substantially uniform dispersion of materials in the mixture.

The blended mixture is then placed in a stainless steel mold having the desired shape. The material in the mold is heated in an oven to about 1 473 degrees F. (245° C.) for about 40 minutes, after which the mold is removed from the oven. The heating makes the binder sticky so that it binds the magnesium hydroxide and carbon particles into a porous block. The magnesium hydroxide may also adhere to the carbon. The material is then compressed in the mold. The compression is used to urge binding as well as to control the pore size.

Formation of the filter medium by extrusion is also possible, though is not desirable for the preferred embodiments as the preferred materials require higher heating temperatures, which require a longer extruder heating zone resulting in a very high backpressure on the extruded block. As a result, these extruded blocks have high pressure drops and low flow-through rates.

Example 2

Following is an example of a preferred procedure for forming a porous cylindrically-shaped block of filter medium. Particles of magnesium hydroxide, activated carbon, and binder are blended into a mixture. The blended mixture is then placed in a stainless steel mold having the desired shape. In this example, the desired shape is cylindrical, so the mold is a tube with a rod protruding along its centerline. The material in the mold is heated in an oven to about 473 degrees F. (245° C.) for about 40 minutes, after which the mold is removed from the oven. The material is then compressed in the mold using a ring-shaped compression member.

The ends of the block can be capped using any suitable adhesive, such as polymeric glue. The block can then be placed in a housing that directs influent water to an outer periphery of the block so that the water passes through the block into the center chamber of the block and is then expelled through one of the end caps as filtered water. Note that the flow through the filter may also be reversed.

Figure 4:
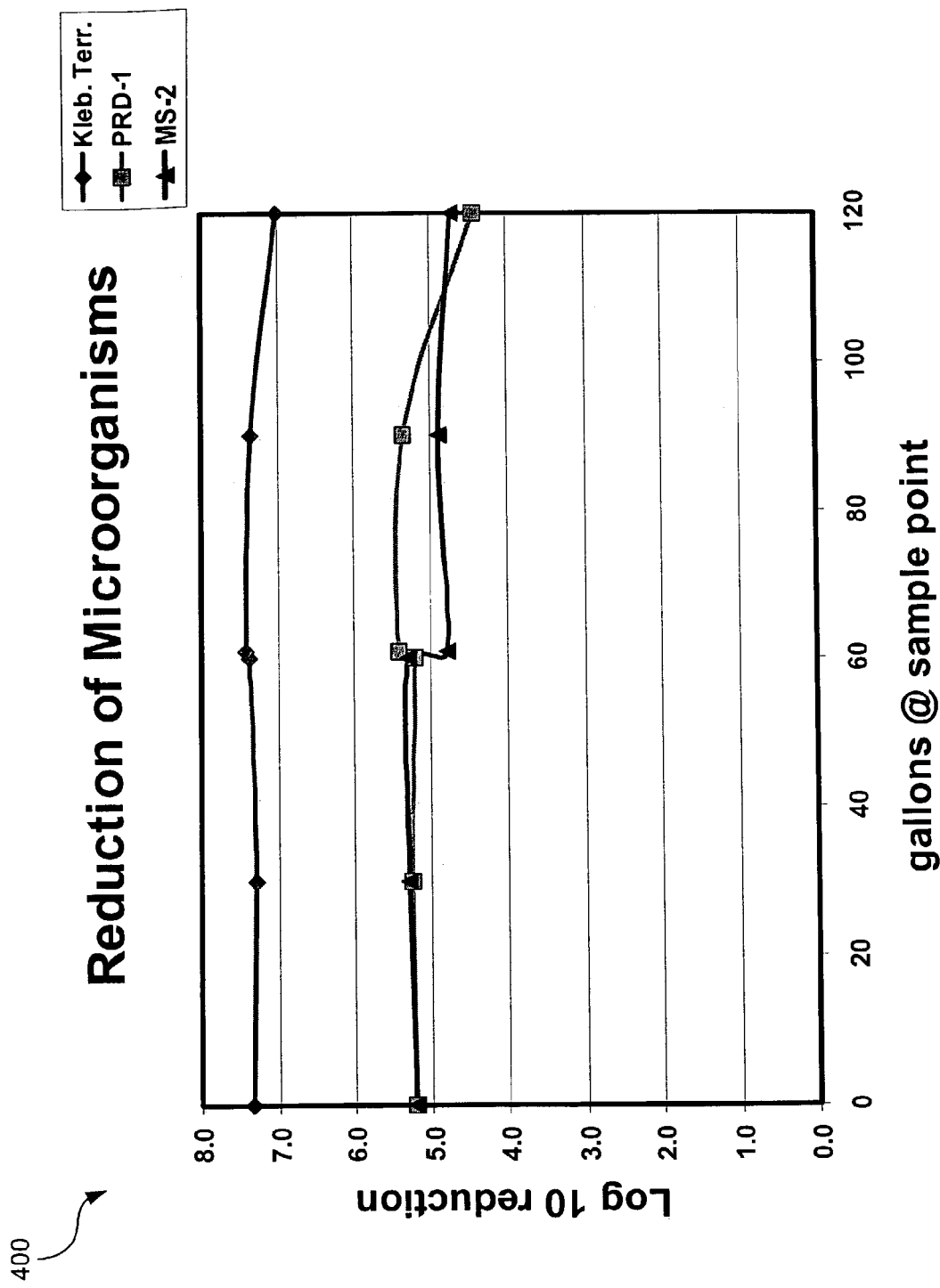
FIG. 4 is a chart showing the removal of PRD-1 and MS-2 (representing rotavirus and poliovirus, respectively) and *Klebsiella Terregina* (representing bacteria) for 120+ gallons.

FIG. 4 is a chart 400 showing the reduction of microorganisms using a filter medium such as the one described in Example 2 with about 30 weight percent magnesium hydroxide, about 25 weight percent ultra high molecular weight polyethylene binder, and about 45 weight percent activated carbon and about a pressure drop of 5.2 atm across the filter medium. As shown, a greater than 4 log reduction of PRD-1 and MS-2 (representing rotavirus and poliovirus, respectively) is achievable for 120+ gallons of water. A greater than 7 log reduction of Klebsiella Terregina (representing bacteria) is also achievable for 120+ gallons.

Examples 3–5

The following table illustrates the results of experiments testing the removal of bacteriophage MS-2 by cylindrical filters with different concentrations of carbon, binder and magnesium hydroxide. The influent liquid for the 30 and 90 gallon runs was water containing a 4.3 log (1×10$^{4.3}$ PFU/ml) concentration of MS-2, where PFU=Plaque Forming Units. The influent liquid for the 120 gallon runs was water containing a 4.5 log (1×10$^{4.5}$ PFU/ml) concentration of MS-2. The filter blocks themselves were about 75 g carbon blocks of the composition shown with dimensions of about 1.94 inches in length, about 1.84 inch outer diameter and about 0.5 inch inner diameter tested on a faucet mount system at 60 PSI.

TABLE 6

Removal of bacteriophage MS-2 by cylindrical filters with different concentrations of magnesium hydroxide

| | | MS-2 log 10 removal | | |
|---|---|---|---|---|
| | | 30 gal | 90 gal | 120 gal |
| A | 37.5% magnesium hydroxide 37.5% Activated Carbon 25% Binder | >4.3 | >4.3 | >4.5 |
| B | 30% magnesium hydroxide 45% Activated Carbon 25% Binder | >4.3 | >4.3 | >4.5 |
| C | 28% magnesium hydroxide 42% Activated Carbon 30% Binder | >4.3 | >4.3 | >4.5 |
| | Control - no magnesium hydroxide | 1.4 | 0.2 | 0.1 |

Mg(OH)$_2$ is from Nabaltec.
Activated Carbon with a mean particle size of 90 microns is from Pacco.
Binder is UHMWPE obtained as GUR ® 2122 from Ticona.

Examples 6–12

FIG. 5 is a table 500 showing the results of seven experiments testing the removal of bacteriophage MS-2 by cylindrical filters with varying concentrations of carbon, binder and magnesium hydroxide. The influent liquid was water containing a 4.755 log (1×10$^{4.755}$ PFU/ml) concentration of MS-2, where PFU=Plaque Forming Units. The filter blocks themselves were about 75 g carbon blocks of the composition and compression shown with dimensions of about 1.94 inches in length, about 1.84 inch outer diameter and about 0.5 inch inner diameter tested on a faucet mount system.

One particular parameter of interest is the concentration of inorganic cation (of high isoelectric point) times the pressure drop. As shown in FIG. 5, the performance of the filters depends on the amount of Mg and the flow rate (or pressure drop) of the filter. The pressure drop shown in FIG. 5 is measured in pounds per square inch (psi). The inorganic cation is calculated as the percentage of Mg(OH)$_2$ in the filter times the ratio of Mg to Mg(OH)$_2$. A sample calculation for Filter A follows:

$$[0.375 \text{ g Mg(OH)}_2/\text{g filter}] \times [0.417 \text{ g Mg/g Mg(OH)}_2]$$
$$\times [4.15 \text{ lb/in}^2] = 0.649 \text{ [g Mg·lb]/[g filter·in}^2] \quad \text{Equation 1}$$

The pressure drop measurements can be taken by measuring the resistance of air flow through the filter at a given pressure, and more particularly, by measuring the differential pressure of air flow through the filter with the tared pressure being the pressure of the air flow without a filter.

As described herein, the filter medium meets EPA standards for viruses (4 log reduction (99.99%) required for viruses). In fact, the filter medium can achieve near 100% microorganism removal at over 120 gallons. In comparative experimentation, the filter disclosed in International Patent Application WO 02/076577 to Hughes was only effective up to about 1.33 gallons; at 30 gallons, very poor results were obtained. Thus, the virus-removing properties of the filter medium disclosed herein can process nearly 100 times the volume, and thus may have almost 100 times the life, as other systems.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A filter medium capable of removing microorganisms from a fluid, comprising:
   particles of activated carbon;
   particles of a substantially insoluble inorganic material having an isoelectric point greater than a pH of a fluid being filtered, the particles of inorganic material mixed together with the particles of activated carbon; and
   a binder for binding the particles of activated carbon and particles of inorganic material, the binder having a melt index of less than about 1 gram per 10 minutes as determined by ASTM D1238 at 190 degrees C. and 15 kilograms load.

2. A filter medium as recited in claim 1, wherein the inorganic material is a magnesium containing material.

3. A filter medium as recited in claim 2, wherein the inorganic material is magnesium hydroxide.

4. A filter medium as recited in claim 1, wherein the inorganic material has an isoelectric point greater than about 9 pH.

5. A filter medium as recited in claim 1, wherein the inorganic material has an isoelectric point greater than about 10 pH.

6. A filter medium as recited in claim 1, wherein the inorganic material is present in an amount between about 25 weight percent to about 45 weight percent of the total weight of the filter medium.

7. A filter medium as recited in claim 1, wherein the binder is an ultra high molecular weight polymer having a molecular weight greater than about 4 million.

8. A filter medium as recited in claim 1, wherein the binder is ultra high molecular weight polyethylene.

9. A filter medium as recited in claim 1, wherein the melt index of the binder is less than about 0.1 grams per 10 minutes as determined by ASTM D 1238 at 190 degrees C. and 15 kilograms load.

10. A filter medium as recited in claim 1, wherein the binder is present in an amount between about 20 weight percent to about 35 weight percent of the total weight of the filter medium.

11. A filter medium as recited in claim 1, wherein 75 grams of the filter medium performs a greater than $1 \times 10^4$ plaque forming units/milliliter reduction of viruses after 100 gallons of water passes through the filter medium.

12. A filter medium as recited in claim 1, wherein the filter medium is cylindrically shaped with an outer diameter of less than about 4 inches and a maximum length between ends of the filter medium of less than about 3 inches.

13. A filter medium as recited in claim 12, wherein the filter medium performs a greater than $1 \times 10^4$ plaque forming units/milliliter reduction of viruses after 100 gallons of water passes through the filter medium.

14. A filter medium as recited in claim 1, wherein a mean pore size of pores formed by the particles and binder is between about 0.01 micron and about 10 microns.

15. A filter medium as recited in claim 1, wherein a mean pore size of pores formed by the particles and binder is between about 0.1 micron and about 1 microns.

16. A filter medium as recited in claim 1, further comprising at least one additional adsorptive material other than the activated carbon and inorganic material.

17. A filter medium as recited in claim 1, wherein the filter medium is formed in a block.

18. A filter medium as recited in claim 1, wherein the filter medium is formed in a sheet.

19. A filter medium as recited in claim 1, wherein the fluid is water.

20. A filter medium as recited in claim 1, wherein a percentage concentration of an inorganic cation provided by the inorganic material times pressure drop through the filter medium in pounds per square inch is at least about 0.5 [g Mg·lb]/[g filter·in$^2$].

21. A method for removing microorganisms from a fluid, comprising causing the fluid to flow through the filter medium of claim 1.

22. A device for removing microorganisms from a fluid, comprising
   a housing; and
   the filter medium of claim 1 positioned in the housing.

23. A device as recited in claim 22, wherein the housing is adapted to be mounted to a pressurized water source.

24. A device as recited in claim 22, wherein the housing is a pitcher.

25. A device as recited in claim 22, wherein the housing is a bottle.

26. A device as recited in claim 22, further comprising a pump coupled to the housing for urging flow of the fluid through the filter medium.

27. A filter medium capable of removing microorganisms from a fluid, comprising:
   particles of activated carbon;
   particles of magnesium hydroxide; and
   a binder for binding the particles of activated carbon and inorganic material, the binder having a melt index of less than about 1 gram per 10 minutes as determined by ASTM D 1238 at 190 degrees C. and 15 kilograms load.

28. A filter medium capable of removing microorganisms from a fluid, comprising:
   particles of activated carbon;
   particles of a substantially insoluble inorganic material having an isoelectric point greater than about 9.0 pH, the particles of organic material mixed together with the particles of activated carbon; and
   an ultra high molecular weight polyethylene binder for binding the particles of activated carbon and inorganic material, the binder having a melt index of less than about 1 gram per 10 minutes as determined by ASTM D 1238 at 190 degrees C. and 15 kilograms load.

29. A filter medium capable of removing microorganisms from a fluid, comprising:
   particles of activated carbon;
   particles of magnesium hydroxide; and
   an ultra high molecular weight polyethylene binder for binding the particles of activated carbon and magnesium hydroxide, the binder having a melt index of less than about 1 gram per 10 minutes as determined by ASTM D 1238 at 190 degrees C. and 15 kilograms load.

30. A filter medium as recited in claim 29, wherein the magnesium hydroxide is present in an amount between about 25 weight percent to about 45 weight percent of the total weight of the filter medium.

31. A filter medium as recited in claim 29, wherein the binder is present in an amount between about 20 weight percent to about 35 weight percent of the total weight of the filter medium.

32. A filter medium capable of removing microorganisms from a fluid, comprising:
   particles of activated carbon;

particles of a substantially insoluble inorganic material having an isoelectric point greater than about 7.0 pH, the particles of organic material mixed together with the particles of activated carbon; and a binder for binding the particles of activated carbon and particles of inorganic material, the binder having a melt index of less than about 1 gram per 10 minutes as determined by ASTM D 1238 at 190 degrees C. and 15 kilograms load.

33. A filter medium capable of removing microorganisms from a fluid, comprising:
    granular activated carbon;
    a material providing an inorganic cation having an isoelectric point greater than a pH of a fluid being filtered; and
    a binder for binding the granular activated carbon and material providing the inorganic cation;
    wherein a percentage concentration of the inorganic cation times pressure drop through the filter medium in pounds per square inch is at least about 0.5 [g Mg·lb]/[g filter in$^2$].

34. A granular filter medium capable of removing microorganisms from a fluid, comprising:
    particles of activated carbon; and
    particles of a substantially insoluble inorganic material having an isoelectric point greater than about 9.0 pH, the particles of organic material mixed together with the particles of activated carbon.

35. A device for removing microorganisms from a fluid, comprising
    a housing; and
    a filter medium according to any of the previous claims, the filter medium being positioned in the housing.

36. A method for forming a filter medium capable of removing microorganisms from a fluid, comprising:
    mixing particles of activated carbon, particles of a substantially insoluble inorganic material having an isoelectric point greater than a pH of a fluid being filtered, and a binder, thereby forming a mixture;
    heating the mixture such that the binder becomes tacky without becoming sufficiently liquid to substantially wet the particles of activated carbon and inorganic material; and
    compressing the heated mixture for setting a pore size of pores formed by the particles and binder, a mean pore size after compression being between 0.01 micron and 10 microns.

37. A method as recited in claim 36, wherein the inorganic material is a magnesium containing material.

38. A method as recited in claim 37, wherein the inorganic material is magnesium hydroxide.

39. A method as recited in claim 36, wherein the inorganic material has an isoelectric point greater than about 9 pH.

40. A method as recited in claim 36, wherein the inorganic material has an isoelectric point greater than about 10 pH.

41. A method as recited in claim 36, wherein the inorganic material is present in an amount between about 25 weight percent to about 45 weight percent of the total weight of the filter medium.

42. A method as recited in claim 36, wherein the binder has a melt index of less than about 1 gram per 10 minutes as determined by ASTM D 1238 at 190 degrees C. and 15 kilograms load a melt index of less than about 1 gram per 10 minutes as determined by ASTM D 1238 at 190 degrees C. and 15 kilograms load.

43. A method as recited in claim 36, wherein the binder is an ultra high molecular weight polymer having a molecular weight greater than about 4 million.

44. A method as recited in claim 36, wherein the binder is ultra high molecular weight polyethylene.

45. A method as recited in claim 36, wherein the melt index of the binder is less than about 0.1 grams per 10 minutes as determined by ASTM D 1238 at 190 degrees C. and 15 kilograms load.

46. A method as recited in claim 36, wherein the binder is present in an amount between about 20 weight percent to about 35 weight percent of the total weight of the filter medium.

47. A method as recited in claim 36, wherein 75 grams of the compressed mixture performs a greater than $1\times10^4$ plaque forming units/milliliter reduction of viruses after 100 gallons of water passes through the filter medium.

48. A method as recited in claim 36, wherein the heated material is compressed in a cylindrically shaped mold to form a block having an outer diameter of less than about 4 inches and a maximum length between ends of the block of less than about 3 inches.

49. A method as recited in claim 48, wherein the block performs a greater than $1\times10^4$ plaque forming units/milliliter reduction of viruses after 100 gallons of water passes through the filter medium.

50. A method as recited in claim 36, further comprising shaping the mixture in the form of a sheet.

51. A method as recited in claim 36, wherein a mean pore size of pores formed by the particles and binder is between about 0.01 micron and about 10 microns.

52. A method as recited in claim 36, wherein a mean pore size of pores formed by the particles and binder is between about 0.1 micron and about 1 microns.

53. A method as recited in claim 36, wherein a percentage concentration of an inorganic cation provided by the inorganic material times pressure drop through the filter medium in pounds per square inch is at least about 0.5 [g Mg·lb]/[g filter·in$^2$].

54. A device for removing microorganisms from water in the event of a bioterrorism attack, comprising:
    a housing; and
    a filter medium positioned in the housing, the filter medium comprising:
    particles of activated carbon;
    particles of a substantially insoluble inorganic material having an isoelectric point greater than about 9.0 pH, the particles of material mixed together with the particles of activated carbon; and
    a binder for binding the particles of activated carbon and particles of inorganic material, the binder having a melt index of less than about 1 gram per 10 minutes as determined by ASTM D1238 at 190 degrees C. and 15 kilograms load.

55. A device as recited in claim 54, wherein the insoluble inorganic material is a magnesium containing compound.

56. A device as recited in claim 54, wherein the magnesium containing compound is magnesium hydroxide.

* * * * *